Aug. 1, 1967          H. ST. PIERRE          3,333,303
                   ROPE OR CABLE CLAMP
                   Filed Oct. 19, 1965
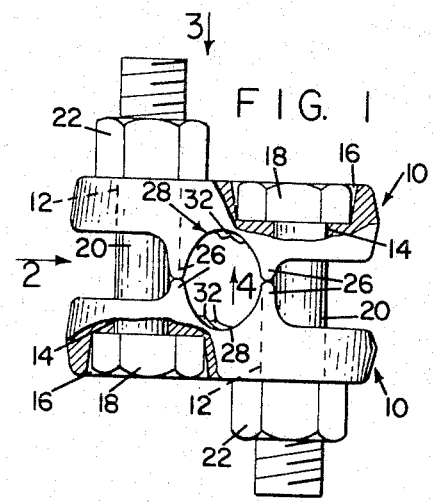
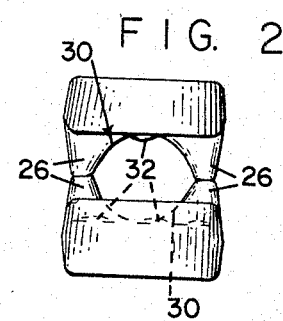
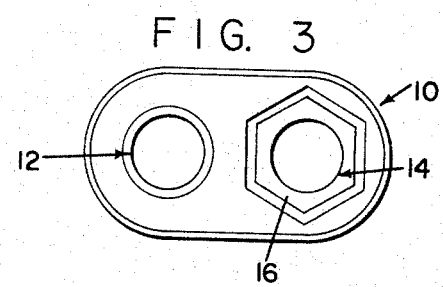
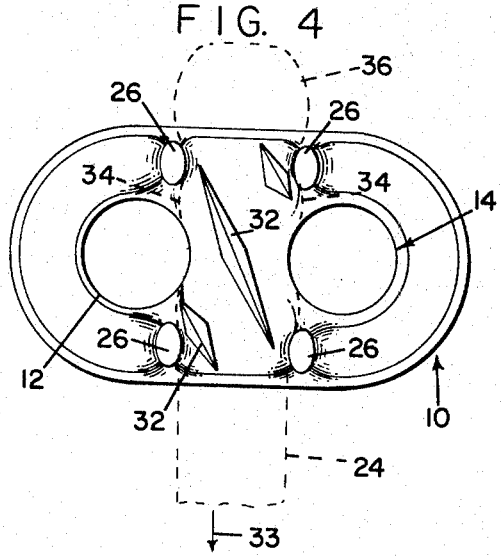
INVENTOR
HENRY ST. PIERRE
BY *Chas. R. Fay,*
ATTORNEY

United States Patent Office 3,333,303
Patented Aug. 1, 1967

3,333,303
ROPE OR CABLE CLAMP
Henry St. Pierre, 50 Frank St., Worcester, Mass. 01604
Filed Oct. 19, 1965, Ser. No. 497,917
1 Claim. (Cl. 24—125)

ABSTRACT OF THE DISCLOSURE

A cable clamp comprising a pair of identical, reversed members, each having aligned holes therethrough for the reception of conventional bolts for securing the same together to clamp the cable between pairs of projections which abut each other and form an oval opening for the reception of the cable, said members being so constructed and arranged as to require no guide means, and the heads of the bolts being sunk in the respective members so that the head of the other bolt or pair of bolts is easily acceptable by means of an open end or box wrench.

---

This invention relates to a new and improved rope or cable clamp or clip, and the principal object of the invention resides in the provision of a device of the class described which is far stronger, less expensive to make and easier to use than similar devices of the prior art.

The principal object of the invention resides in the provision of a cable clamp which utilizes a pair of very simple and identical forgings, each of which provides a socket for the head of a conventional bolt and also an aperture for the reception of another bolt the head of which is located in a like socket in the other forged member, said members being applied in reverse condition with respect to each other to clamp two cables, rods or other elements therebetween and between the bolts, there being only two exposed nuts for said bolts, said nuts being quickly and easily rotated to tightly clamp the objects in the device, and said bolts being easily removed so that when broken, stretched or rusted, they can be renewed. The forged member is extremely simple in construction and inexpensive to make, so that the user of the clamp need only buy the forged pieces and can buy or make the bolts as he sees fit without the necessity of the special bolt members of the prior art.

The new clamp also provides inclined ridges in the areas of grip on the cable, preventing slip, and the effect is that the cable will bulge under tension and thus is held even more tightly, to the limit of rupture of the cable, far greater than clamps for this purpose in the prior art.

Other objects and advantages of the invention will appear hereinafter.

Reference is to be had to the accompanying drawings in which:

FIG. 1 is a view in elevation with parts in section illustrating the invention;

FIG. 2 is an end view thereof with bolts removed looking in the direction of arrow 2 in FIG. 1;

FIG. 3 is a plan view looking in the direction of arrow 3 in FIG. 1 but with the bolts removed, and FIG. 4 is a bottom plan view of one of the members of the clamp looking in the direction of the arrow 4 in FIG. 1 and showing in dotted lines the bulging effect on a clamped cable.

In carrying out the present invention there is provided for each clamp a pair of separate but identical forged members which are generally elliptical in nature, see for instance FIG. 3. Each piece is generally indicated by the reference numeral 10, and each has one aperture 12, and any other aperture 14. The aperture at 14 is also provided with a sunken hex head socket 16 in which the head 18 of a common machine bolt 20 may be inserted so that it is nonrotatable.

It will be seen that the bolts 20 may be placed through reversed members 10, being held in the sockets 16 against rotation and that the nuts 22 may be quickly and easily turned up thereon with any kind of wrench so as to clamp the objects such as cables, rods, etc. at 24 together. Even a monkey wrench can be used on the nuts 22 because they are unimpeded in any way.

At the sides of the member 10 opposite from the sockets at 16, there are provided fingers or projections 26 which are arranged in spaced pairs and are provided with arcuate surfaces forming openings therebetween in two directions, as at 28 and 30. The surfaces 30 contact the cable or rope and are provided with ridges 32 arranged at an incline to the direction of pull on the cable in order to make a better gripping surface.

The direction of pull is indicated by the arrow 33 in FIG. 4. The ridges are provided with reduced edges but are as forged, so that the edges are somewhat blunt and do not cut into the cable although they are impressed in it to some extent. Thus when the parts are together as in FIG. 1 with a cable clamped therebetween, the cable cannot slip. Under increased tension in the direction of arrow 32 the cable starts to bulge outwardly at surfaces 28 towards the bolts as clearly shown at 34 in FIG. 4 and also at the clamped end 36. The greater the force exerted, the more the bulge, and the greater the bulge, the greater the holding power of the clamp.

This effect is achieved even though the projections at 26 abut each other and it will be seen therefore that the pressure with which the nuts 22 are turned up is not determinative of the holding power of the clamp, except of course that these bolts must be tight so that the members 10, 10 do not come apart.

In actual tests, the cable ruptures at about the point of slip and the clamps hold about two-and-a-half times better than any other clamp tested.

Also it will be noted that the portions of the members 10 which contain the sockets 16 are made thicker for this purpose so that the heads of the bolts are fully sunk and coplanar with the top surfaces of the individual members 10 as clearly shown in FIG. 1.

Having thus described my invention and the advantages thereof, I do not wish to be limited to the details herein disclosed, otherwise than as set forth in the claim, but what I claim is:

A cable clamp comprising a pair of identical members adapted to be clamped together to clamp a cable therebetween by means of a pair of conventional bolts,
  each of said identical members comprising a body having a coplanar surface at one side thereof and a generally three portion surface at the opposite side thereof, said portions comprising a first end portion, a second end portion and an intermediate portion separating the end portions, the members having their opposite sides facing each other,
  the first end portion having a predetermined thickness and an aperture therethrough for the reception of one of the bolts generally normal with respect to said coplanar surface, the second end portion being relatively thicker and also including an aperture therethrough for the reception of the other bolt, said thicker end portion being provided with a socket intersecting the coplanar surface and adapted to receive the head of said other bolt in flush relationship with respect to said surface,
  the intermediate portion of said member being provided with two spaced pairs of outwardly extending spaced projections defining between them a surface presenting concave configurations between the pairs of projections and also between the projections of each pair, the projections of the two identical members being adapted to engage each other thereby defining an oval through opening through which the cable to be secured is to extend and an oval through opening extending generally normal to the first-named oval opening, said second-named oval opening forming a lateral opening with respect to the cable, so that upon high compression being exerted upon said cable, the same will tend to bulge into said second-named oval opening, the terminal end edges of said first and second end portions being free and unimpeded and in general alignment with each other, said end portions having flat surfaces at the sides thereof opposite the coplanar surface, said bolts extending in opposite directions and each bolt having a head, each head being received in flush relationship in its socket and extending across the cable clamp and through the opposite member thereof, there being a nut adapted to be applied to the free end of each bolt and being capable of being tightened in flatwise condition against the respective coplanar surface.

References Cited

UNITED STATES PATENTS

| | | | |
|---|---|---|---|
| 838,500 | 12/1906 | Cook | 24—135 |
| 851,822 | 4/1907 | Meech | 24—135 |
| 1,388,692 | 8/1921 | Blaeser | 24—135 |
| 1,423,263 | 7/1922 | Salter | 24—135 |
| 2,013,437 | 9/1935 | Farrell | 24—135 |
| 2,046,247 | 6/1936 | Chandler. | |
| 2,799,012 | 7/1957 | Jones | 24—125 X |

FOREIGN PATENTS

| | | |
|---|---|---|
| 1,194,026 | 11/1959 | France. |
| 1,358,421 | 3/1964 | France. |
| 291,228 | 5/1928 | Great Britain. |

BERNARD A. GELAK, *Primary Examiner.*